(12) United States Patent
Roberts et al.

(10) Patent No.: US 8,175,247 B2
(45) Date of Patent: *May 8, 2012

(54) CALL WAITING PRIORITY ALERT

(75) Inventors: Linda Ann Roberts, Decatur, GA (US); Edward Michael Silver, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/576,114

(22) Filed: Oct. 8, 2009

(65) Prior Publication Data

US 2010/0020958 A1    Jan. 28, 2010

Related U.S. Application Data

(63) Continuation of application No. 11/613,191, filed on Dec. 20, 2006, now Pat. No. 7,602,896, which is a continuation of application No. 09/849,971, filed on May 8, 2001, now Pat. No. 7,254,226.

(51) Int. Cl.
*H04M 3/42* (2006.01)

(52) U.S. Cl. .......... 379/215.01; 379/142.08; 379/210.02

(58) Field of Classification Search ............ 379/215.01, 379/207.16, 142.06, 207.15
See application file for complete search history.

(56) References Cited

U.S. PATENT DOCUMENTS

| | | | |
|---|---|---|---|
| 4,649,433 A | 3/1987 | Verhoeven | |
| 4,663,777 A | 5/1987 | Szeto | |
| 4,850,013 A | 7/1989 | Rose | |
| 5,329,578 A | 7/1994 | Brennan | |
| 5,420,920 A | 5/1995 | Capper | |
| 5,506,893 A | 4/1996 | Buscher | |
| 5,537,470 A | 7/1996 | Lee | |
| 5,539,809 A | 7/1996 | Mayer | |
| 5,563,936 A | 10/1996 | Washington | |
| 5,636,269 A | 6/1997 | Eisdorfer | |
| 5,703,943 A | 12/1997 | Otto | |
| 5,742,905 A | 4/1998 | Pepe et al. | |
| 5,825,867 A * | 10/1998 | Epler et al. | 379/215.01 |
| 5,898,769 A | 4/1999 | Furman | |
| 5,926,537 A | 7/1999 | Birze | |
| 5,948,061 A | 9/1999 | Merriman | |
| 6,005,870 A * | 12/1999 | Leung et al. | 370/466 |
| 6,337,904 B1 | 1/2002 | Gisby | |
| 6,415,026 B1 | 7/2002 | Flood | |
| 6,438,222 B1* | 8/2002 | Burg | 379/215.01 |
| 6,442,283 B1 | 8/2002 | Tewfik | |
| 6,493,431 B1 | 12/2002 | Troen-Krasnow | |

(Continued)

FOREIGN PATENT DOCUMENTS

WO    03/030501    4/2003

*Primary Examiner* — Simon Sing
(74) *Attorney, Agent, or Firm* — Parks IP Law LLC; Jennifer P. Medlin, Esq.

(57) ABSTRACT

A method for delivering a priority call waiting alert service to a telephone subscriber. An embodiment of the present invention may be implemented on an Advanced Intelligent Network (AIN). When a call intended the subscriber is received by a service switching point from a calling party while the telephone line is already engaged in a first communication between the subscriber and a third party, the calling party is solicited to supply a priority code. If the priority code is recognized by a service control point, a call waiting tone or a priority alert signal associated with the priority code is played to alert the subscriber that a priority call has been received.

20 Claims, 6 Drawing Sheets

U.S. PATENT DOCUMENTS

| | | |
|---|---|---|
| 6,496,692 B1 | 12/2002 | Shanahan |
| 6,519,335 B1 * | 2/2003 | Bushnell .................. 379/215.01 |
| 6,532,490 B1 | 3/2003 | Lewis |
| 6,542,602 B1 | 4/2003 | Elazar |
| 6,590,970 B1 | 7/2003 | Cai |
| 6,603,854 B1 | 8/2003 | Judkins |
| 6,650,746 B1 * | 11/2003 | Groen et al. ............. 379/207.16 |
| 6,659,597 B2 | 12/2003 | Murata |
| 6,665,378 B1 | 12/2003 | Spielman et al. |
| 6,665,715 B1 | 12/2003 | Houri |
| 6,697,357 B2 | 2/2004 | Emerson |
| 6,697,479 B1 * | 2/2004 | Barnes et al. ............. 379/215.01 |
| 6,704,405 B1 * | 3/2004 | Farris et al. .............. 379/215.01 |
| 6,718,026 B1 | 4/2004 | Pershan |
| 6,724,872 B1 | 4/2004 | Moore et al. |
| 6,725,872 B2 | 4/2004 | Kindell |
| 6,741,689 B2 | 5/2004 | Burg |
| 6,757,732 B1 | 6/2004 | Sollee et al. |
| 6,778,655 B1 * | 8/2004 | Veschi et al. ............. 379/215.01 |
| 6,798,876 B1 | 9/2004 | Bala |
| 6,826,617 B1 | 11/2004 | Ansell |
| 6,865,384 B2 | 3/2005 | Sagi |
| 6,870,924 B1 | 3/2005 | Ukon |
| 6,993,123 B1 | 1/2006 | Allen et al. |
| 7,020,255 B2 | 3/2006 | Gruchala |
| 7,085,578 B2 | 8/2006 | Barclay |
| 7,313,227 B2 | 12/2007 | Jones |
| 7,403,600 B2 | 7/2008 | Koch et al. |
| 2002/0007400 A1 | 1/2002 | Pedersen |
| 2002/0091777 A1 | 7/2002 | Schwartz |
| 2002/0172338 A1 | 11/2002 | Lee et al. |
| 2003/0002633 A1 | 1/2003 | Kredo et al. |
| 2003/0119522 A1 | 6/2003 | Barclay et al. |
| 2003/0193967 A1 | 10/2003 | Fenton et al. |
| 2004/0233892 A1 | 11/2004 | Roberts et al. |

* cited by examiner

CALL WAITING PRIORITY ALERT

CROSS-REFERENCE TO RELATED APPLICATIONS

This application is a continuation of and claims priority to U.S. patent application Ser. No. 11/613,191 filed Dec. 20, 2006 and issued as U.S. Pat. No. 7,602,896 on Oct. 13, 2009, which is a continuation of U.S. patent application Ser. No. 09/849,971 filed May 8, 2001 and issued as U.S. Pat. No. 7,254,226 on Aug. 7, 2007, the contents of which are hereby incorporated by reference in their entirety.

BACKGROUND

1. Field of the Invention

The present invention relates to telecommunications, and more particularly, to a system and method for providing a call waiting priority alert service to telephone line subscribers.

2. Background of the Invention

Using the telephone to communicate has become an important aspect of our lives. As a result, almost every family in an industrialized nation has a telephone line. On a daily basis, a typical family may receive a large number of telephone calls. The number of incoming calls could be even larger if the family has become a target customer of a telemarketing campaign. A telephone user may find it annoying to have answered a call not intended for him or her, especially when the call is from an unknown person such as a telemarketing representative.

The annoyance of answering calls from unknown calling parties could be aggravated in a call waiting situation. For example, a telephone service subscriber could be extremely annoyed when he must temporarily put a first call on hold to answer a second call, only to find out the second call is from a telemarketing company or other unknown caller.

Accordingly, there is a need for a system and method that would alert a subscriber (who is already engaged in a first communication session with a third party) of an incoming call from a calling party, but only if the calling party is one from whom the subscriber would not mind entertaining. A call from an unknown or undesirable calling party would not invoke the call waiting feature of the subscriber's telephone line. Alternatively, a call from the unknown calling party would be associated with a regular call waiting tone, but a call from the priority caller would be associated with a priority alert signal.

SUMMARY OF THE INVENTION

The present invention is a system and method that can determine whether an incoming call for a subscriber is a priority call. One method for implementing the present invention involves the use of a priority code. The subscriber can associate at least one priority code with his or her telephone number (the subscriber number). If two or more priority codes are used, then the priority codes can be associated with multiple priority levels.

In one embodiment, when an incoming call from a calling party is detected while the subscriber's telephone line has already been engaged in a communication session between the subscriber and a third party, the calling party will be asked by the system of the present invention to supply a priority code. If the system recognizes the priority code, the subscriber will hear a priority alert signal associated with the priority code. The subscriber can then decide whether to suspend the ongoing session with the third party to answer the incoming call. If the calling party fails to supply a priority code or if the priority code supplied by the calling party is not recognized by the system, the subscriber will hear a regular call waiting tone, indicating the incoming call is not a priority call. In other preferred embodiments, the system can be adapted to ignore all non-priority calls, meaning the subscriber will not hear any tone unless the calling party supplies a priority code that is recognizable by the system.

The present invention can be implemented in any suitable telephone systems or networks. For example, the invention may be adapted for an Advanced Intelligent Network (AIN). In an AIN, a preferred embodiment of the system of the present invention comprises a service switching point (SSP) and a service control point (SCP). The SSP is connected to the telephone line of the subscriber. In an exemplary embodiment, the SSP may be provisioned with a trigger. The trigger can detect a condition at the SSP to cause the SSP to generate a query to the SCP. The SCP then uses information contained in the query to review a subscriber list that is associated with the subscriber number. The subscriber list may be retrieved by the SCP from a database.

The subscriber list contains information related to one or more priority codes. Each of the priority codes is associated with a priority alert signal. The priority alert signal may be a tone or an earcon (musical sound). In addition, the priority alert signal may be a spoken alert, e.g., the priority alert signal could be a recorded speech segment comprising "a priority call is waiting."

In a preferred embodiment, the subscriber list can be modified by the subscriber at any time. For example, the subscriber may add, delete, or otherwise edit the information on the subscriber list via a computer network. In an exemplary embodiment, the subscriber can edit the subscriber list via the Internet.

A method for using the present invention on the AIN to implement a call waiting priority alert service may comprise the following steps. First, a subscriber list associated with a subscriber number is created. The subscriber list may contain one or more priority codes, each associated with one priority alert signal. Second, the subscriber list may be stored in a database that is accessible by the SCP.

Third, one or more triggers may be provisioned at the SSP that serves the telephone line of the subscriber. A termination attempt trigger or a terminating busy/no answer trigger may be used to detect incoming calls intended for the subscriber.

Fourth, when a call is received at the SSP, i.e., a caller or a calling party has dialed the telephone number of the subscriber (the subscriber number), the call is detected by a trigger. As a result, the SSP launches a query to the SCP. The query may comprise, among other information, the subscriber number (which is the telephone number of the subscriber, i.e., the telephone number of the called party).

Fifth, the SCP then uses the subscriber number to retrieve the subscriber list. Sixth, using the subscriber number, the SCP recognizes that the subscriber has a subscription to the service of the present invention. Sixth, the SCP sends an instruction to the SSP to solicit a priority code from the calling part. Seventh, when the calling parties supplies the priority code, by using the keypad or by speaking, the priority code is forwarded to the SCP. Eighth, the SCP determines whether the priority code received is on the subscriber list. If the priority code is recognizable, i.e., it is on the subscriber list, the SCP instructs the SSP to play a priority alert signal associated with the priority code. However, if the priority code is unrecognizable, i.e., it is not on the subscriber list, the SCP instructs the SSP to execute a default action. The default action may be, for example, to play a regular call waiting tone or to play no tone at all.

DETAILED DESCRIPTION OF PREFERRED EMBODIMENTS

Figure 1:
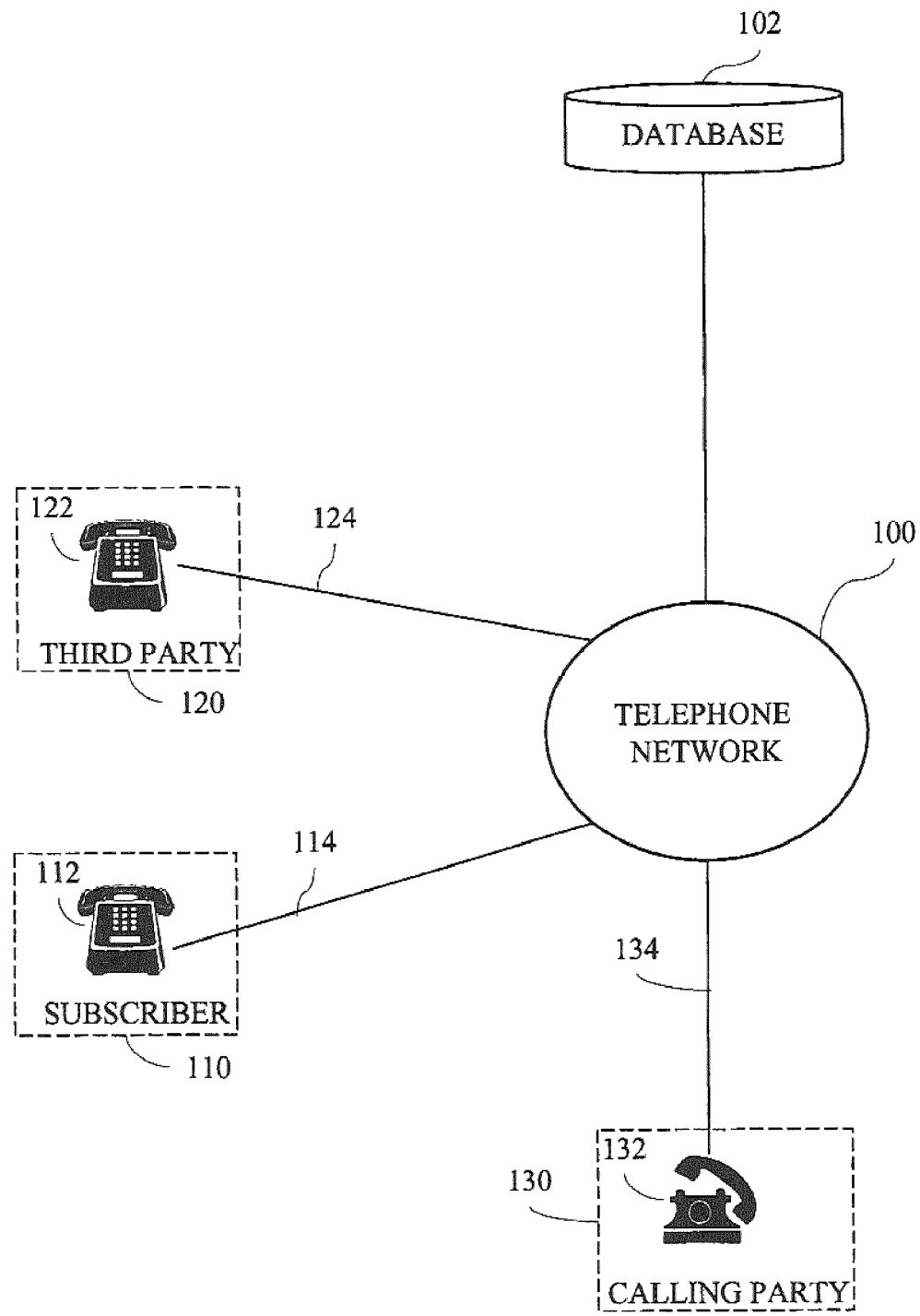
FIG. 1 is a schematic diagram showing the system architecture of an embodiment of the present invention.

FIG. 1 is a schematic diagram showing the system architecture of an embodiment of the present invention. Subscriber 110 is a customer of telephone network 100. Telephone network 100 may be a wireless network or a wireline network. Telephone network 100 provides telephone services to subscriber 110's telephone line 114. If telephone network 100 is a wireless network, then telephone line 114 would be a wireless connection to subscriber 110's telephone equipment 112. Equipment 112, 122, and 132, although depicted as telephones, may also be other wireline or wireless devices such as interactive pagers, computers, personal digital assistants or any other apparatus that can communicate with telephone network 100. A first communication session between subscriber 110 and third party 120 may be established, for example, via telephone lines 114 and 124. Similarly, calling party 130 can communicate with subscriber 110, for example, through telephone lines 184 and 114.

Figure 2:
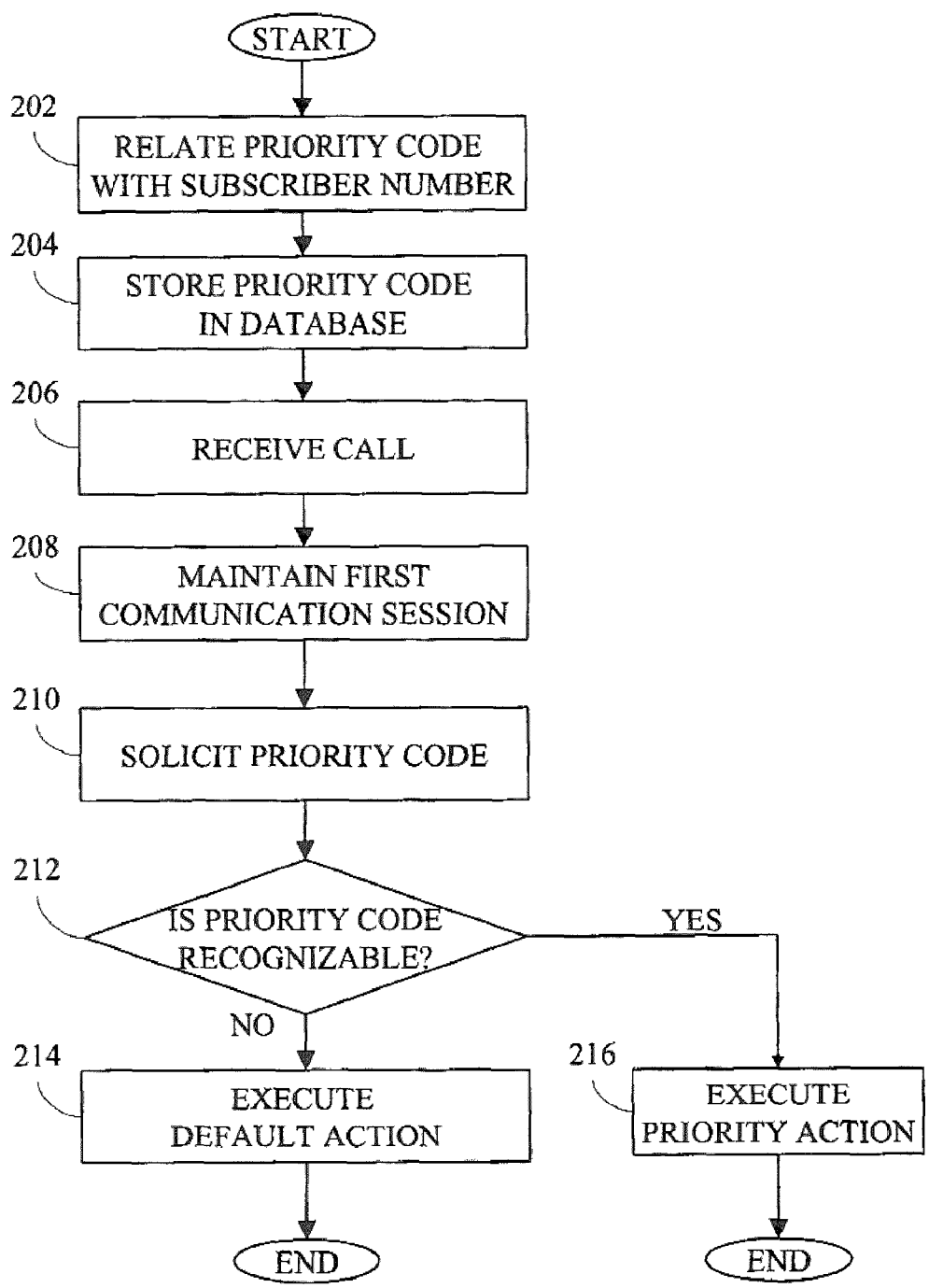
FIG. 2 is a flowchart illustrating the steps involved in using an embodiment of the present invention.

FIG. 2 is a flowchart illustrating exemplary steps for using an embodiment of the present invention. In step 202, a relationship between a priority code and the telephone number associated with telephone line 114 of subscriber 110 is created. The telephone number of subscriber 110 may be hereinafter referred to as the subscriber number. The priority code can be a number or a series of numbers. For example, the priority code may be "4444."

In step 204, the relationship between the subscriber number and the priority code may be stored in a subscriber list. The subscriber list can be placed in database 102, shown in FIG. 1. Database 102 can be placed anywhere as long as it is accessible by telephone network 100. For example, database 102 can be maintained within telephone network 100 at a facility associated with telephone network 100. Alternatively, database 102 can be stored in a computer connected to telephone network 100.

For example, assume that subscriber 110 is already engaged in a first communication session with third party 120 when calling party 130 dials the subscriber number. In step 206, the incoming call from calling party 120 is received by telephone network 100. In step 208, telephone network 100 maintains the communication session between subscriber 110 and third party 120. In step 210, while subscriber 110 continues his or her communication session with third party 120 uninterrupted, telephone network 100 asks calling party 130 to enter a priority code. Calling party 130 may or may not respond with a priority code.

In step 212, if calling party 130 fails to supply a priority code, or provides a priority code that is not recognized by telephone network 100, the process goes to step 214. Otherwise, if calling party 130 supplies a recognizable priority code, that is, the priority code supplied by calling party 130 appears on the subscriber list, the process goes to step 216.

In step 214, telephone network 100 can execute a default action. One default action is to interrupt the communication session between subscriber 110 and third party 130 with a regular call waiting tone, alerting subscriber 110 that a non-priority calling party is waiting. Another default action is to leave the communication session uninterrupted, and play a busy signal for calling party 130 or direct the caller to the subscriber's voicemail. A third default action is to play an announcement informing calling party 130 that unless a recognizable priority code is received, subscriber 110 will not be alerted of the call from calling party 130.

In step 216, when calling party 130 has supplied a recognizable priority code, telephone network 100 interrupts the communication session between subscriber 110 and third party 120 with a priority alert signal. In one embodiment, as described above, the priority alert signal is different from a regular call waiting tone so that subscriber 110 can know that a priority call is waiting. For example, the priority alert signal may be a tone or an earcon (musical sound). In addition, the priority alert signal may be a spoken alert, e.g., the priority alert signal could be a recorded speech segment comprising "a priority call is waiting."

In another embodiment, in which the response to an unrecognized priority code is to leave the call uninterrupted, the regular call waiting tone may be used. In preferred embodiments, the present invention can be adapted to have a plurality of priority alert signals that are associated with a plurality of priority codes. Each priority alert signal represents a different level of priority or urgency to subscriber 110 or may be used to identify the third party caller.

Figure 3:
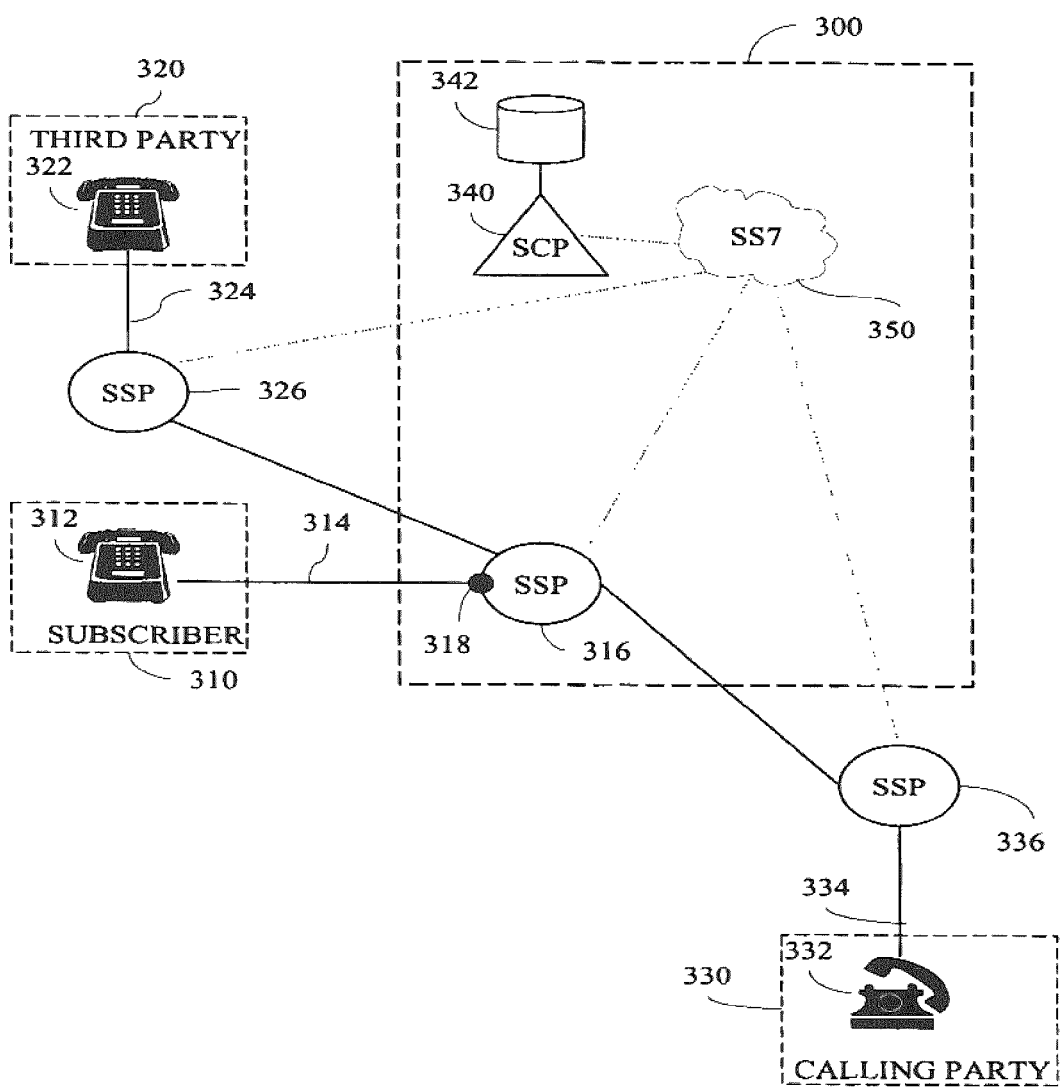
FIG. 3 is a schematic diagram showing the system architecture of a first preferred embodiment of the present invention implemented in an Advanced Intelligent Network (AIN).

FIG. 3 is a schematic diagram showing the system architecture of a first preferred embodiment of the present invention implemented in an AIN. The AIN is described in U.S. Pat. Nos. 5,701,301, and 5,838,774, which are hereby incorporated by reference in their entirety.

Telephone network 300 is an AIN. Subscriber 310 is a customer or service subscriber of the present invention. Telephone network 300 may be the service provider of the present invention. Subscriber 310 has customer premises equipment (CPE) 312. CPE 312 may be a telephone set or a computer or another communication device. Subscriber 310 may use CPE 312 to effect communication sessions through telephone line 314. The telephone number associated with telephone line 314 may be hereinafter referred to as the subscriber number. Telephone line 314 is connected to service switching point (SSP) 316, which is part of telephone network 300.

One or more triggers associated with telephone line 314 may be provisioned on SSP 316. For example, trigger 318 may be a terminating busy/no answer trigger. Third party 320 is associated with telephone line 324 and CPE 322. Subscriber 310 and third party 320 may engage in a communication session through SSP 316 and SSP 326. For purposes of illustration, SSP 326 is shown as being outside telephone network 300. However, SSP 326 may be an SSP on telephone network 300, and may even be SSP 318.

Trigger 318 can detect incoming calls intended for subscriber 310. For example, when calling party 330 uses CPE 332 on telephone line 334 to dial the subscriber number, trigger 318 can detect the call. Although calling party 330 is shown to be connected to SSP 336, it is understood that in some circumstances caller 330 could be directly connected to SSP 316.

The detection of an incoming call by trigger 318 causes SSP 316 to launch a query. For example, the query launched by SSP 316 may be sent to service control point (SCP) 340 over the AIN's signaling network 350. In a preferred embodiment signaling network 350 uses common channel signaling system SS7. The query includes the subscriber number in the Called_Party_ID field of the query, and a calling number in the Calling_Party_ID field. The calling number is the telephone number of calling party 330, i.e., the telephone number associated with telephone line 334.

SCP 340 then uses the subscriber number to access a subscriber list associated with subscriber 310. The subscriber list may be stored in database 342. The subscriber list may comprise one or more priority codes that are associated with subscriber 310's subscriber number.

Using the subscriber number, SCP 340 can retrieve one or more call processing instructions from database 342. The call processing instructions can be one of several instructions from SCP 340 to SSP 316 regarding how the call from calling party 330 should be handled. The instructions can be provided by SCP 340 to SSP 316 in the form of a response to the query.

Figure 4:
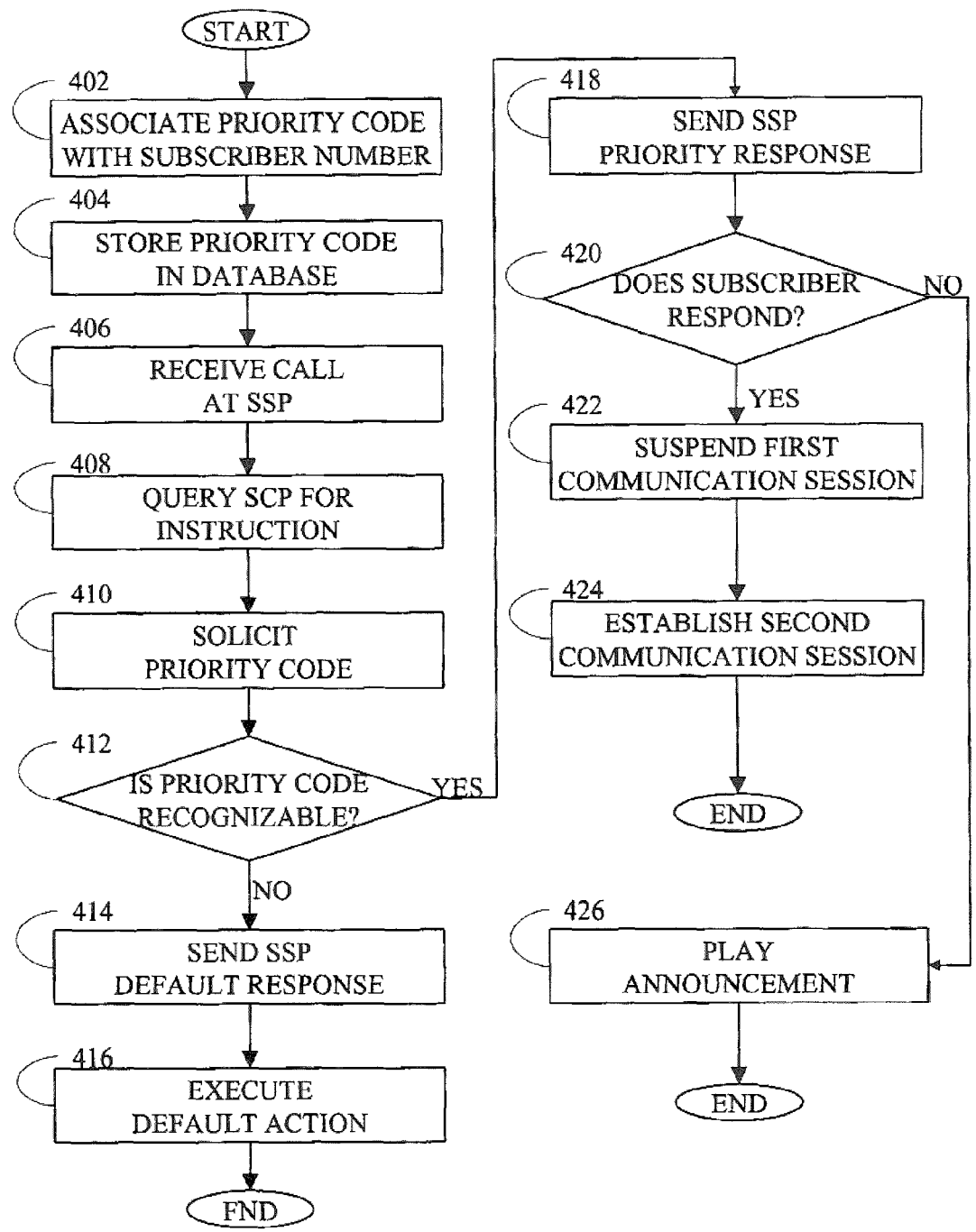
FIG. 4 is a flowchart illustrating the steps involved in using the first preferred embodiment of the present invention involving one priority level.

FIG. 4 is a flowchart illustrating the steps involved in using the first preferred embodiment of the present invention. With a subscription to a service of the present invention, subscriber 310 who is engaged in a first communication session with third party 320 can be alerted when an incoming call from calling party 330 is received, provided that calling party 330 supplies a recognizable priority code. In other words, subscriber 310 will not be alerted if calling party 330 does not provide a recognizable priority code. In that case, calling party 330 may hear a busy tone or announcement that subscriber 310 is not available to take the call.

A method for implementing the first preferred embodiment may comprise the following steps. In step 402, at least one priority code is associated with the subscriber number. For illustration purposes, the subscriber number is "123-456-7890."

The priority code may be any number that subscriber 310 so designates to implement the present invention. The priority code can have any number of digits. Preferably, the priority code has two to six digits. For example, subscriber 310 may designate "8888" as a priority code. The priority code must be provided by subscriber 310 to potential calling parties from whom subscriber 310 wishes to have priority call waiting treatment.

In step 404, the priority code and the subscriber number are stored in a database. The database is preferably accessible to SCP 340. For example, database 342 may be used to store the priority code and the subscriber number. In addition to the priority code, the database includes information regarding the priority alert signal associated with the priority code. In this embodiment, the priority alert signal is the regular call waiting tone. Preferably, the relationship between the priority code, the subscriber number, and the priority alert signal can be stored in a subscriber list or a table, such as, for example, Table 1 below.

TABLE 1

| Subscriber Number | Recognizable Priority Code | Priority Alert Signal |
| --- | --- | --- |
| 123-456-7890 | 8888 | Regular call waiting tone |

In step 406, when an incoming call from calling party 330 arrives at SSP 316 while subscriber 310 is already engaged in a communication session with third party 320, the call is detected by trigger 318. Trigger 318 may be a terminating busy/no answer trigger. In step 408, SSP 316 launches a query to SCP 340. The query may be, for example, a Terminating Busy/No Answer query.

In step 410, while the communication session between subscriber 310 and third party 320 remains uninterrupted, SCP 340 sends a first instruction to SSP 316 to solicit a priority code from calling party 330. The solicitation may be in the form of an announcement. For example, the announcement may comprise, "The party you wish to reach is on the phone, please enter a priority code if you wish to alert the party about this call."

In step 412, assuming calling party 330 keys in or says a priority code, SCP 340 determines whether the priority code provided by calling party 330 is a recognizable priority code. For example, SCP 340 may access database 342 to review Table 1. If the priority code provided by calling party 330 is "8888", the process goes to step 418; otherwise, the process goes to step 414.

In step 414, SCP 340 sends a default response to SSP 316. The default response may any suitable action supported by the AIN. For example, the default response may comprise an instruction to play an announcement to calling party 330. In step 416, SSP 316 executes a default action associated with the default response. For example, SSP 316 may play the following announcement, "You have not provided a recognizable priority code. Good Bye." In preferred embodiments, calling party 330 may be provided with more than one opportunity to supply a recognizable priority code.

In step 418, if the priority code supplied by calling party 330 is recognizable by SCP 340, i.e., it appears on Table 1, SCP 340 sends SSP 316 a priority response. The priority response may be an Authorize_Termination message, including special codes in the ControllingLegTreatment field. For example, if ControllingLegTreatment field contains a regular call waiting tone indication, SSP 316 plays the regular call waiting tone to alert subscriber 310 that a call is waiting.

Depending on what subscriber 310 chooses to do in step 420, the process can go to either step 422 or step 426. For example, if subscriber 310 presses a key that is designated, such as a "flash" key, to answer the call the process goes to step 422. In step 422, the first communication session between subscriber 310 and third party 320 is suspended by SSP 316 using known call waiting technologies. In step 424, a second communication session is establish between calling party 330 and subscriber 310.

If in step 420 subscriber 310 chooses to ignore the call waiting, an announcement may be played by SSP 316 after a predetermined period of time or a number of rings. For example, if subscriber 310 does not pick up the call after five rings, an announcement may be played, for example, "The party you wish to reach is unavailable. Please try again later."

Figure 5:
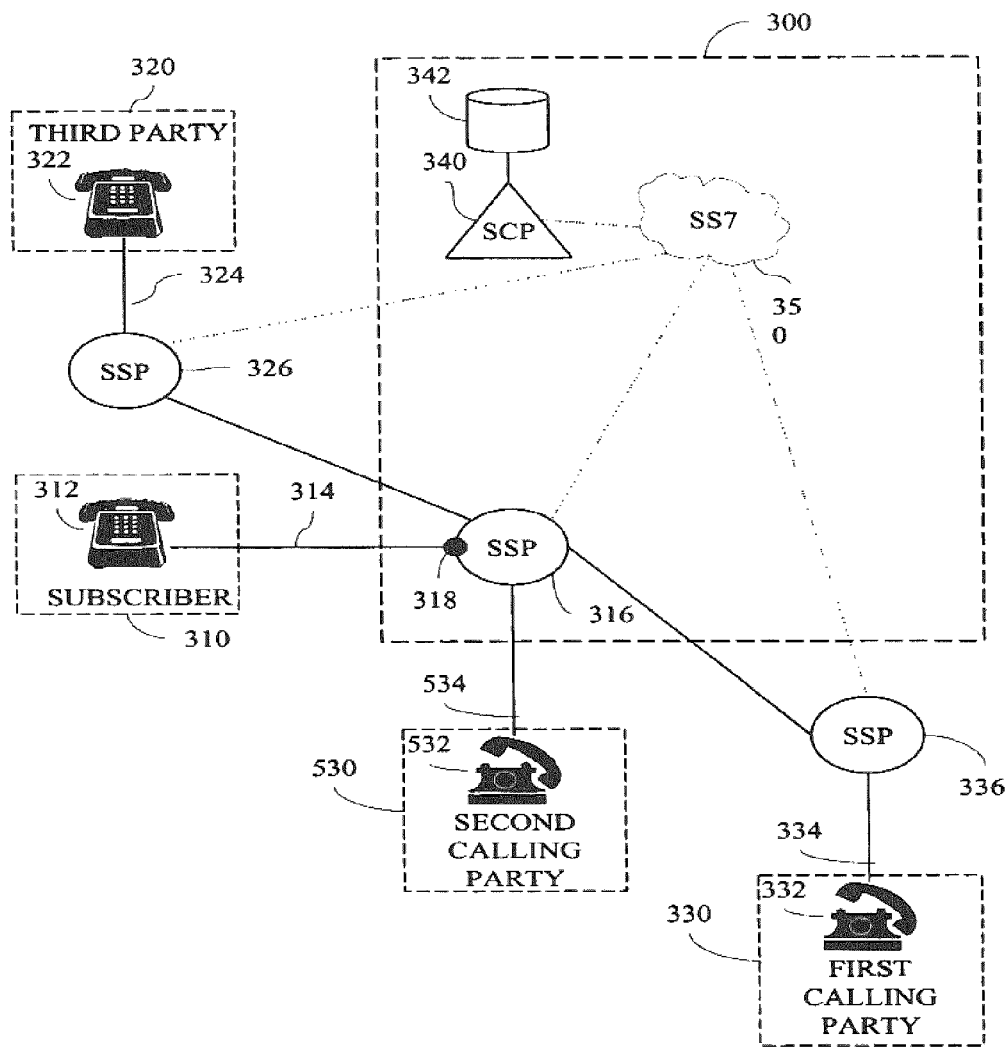
FIG. 5 is a schematic diagram showing the system architecture of a second preferred embodiment of the present invention involving multiple priority levels.

FIG. 5 is a schematic diagram showing the system architecture of a second preferred embodiment of the present invention involving multiple priority levels. In this embodiment, second calling party 530 has CPE 532 that can be used to dial the subscriber number using telephone line 534. Each of first calling party 330 and second calling party 530 may be given one or more priority codes. Each of the priority codes is associated with a priority alert signal, which is played in lieu of a regular call waiting tone to alert subscriber 310 that a priority call has been received. In one specific example, first calling party 330 may be given a first priority code, and second calling party 530 may be given a second priority code. In this manner, subscriber 310 who is familiar with the priority alert signals associated with the first and second priority codes will know which calling party is waiting. In another specific example, each of first calling party 330 and second calling party 530 is provided with both first and second priority codes, but they are advised to use the first priority code in one situation and the second priority code in a different situation. The various uses of the priority codes are explained further below.

Figure 6:
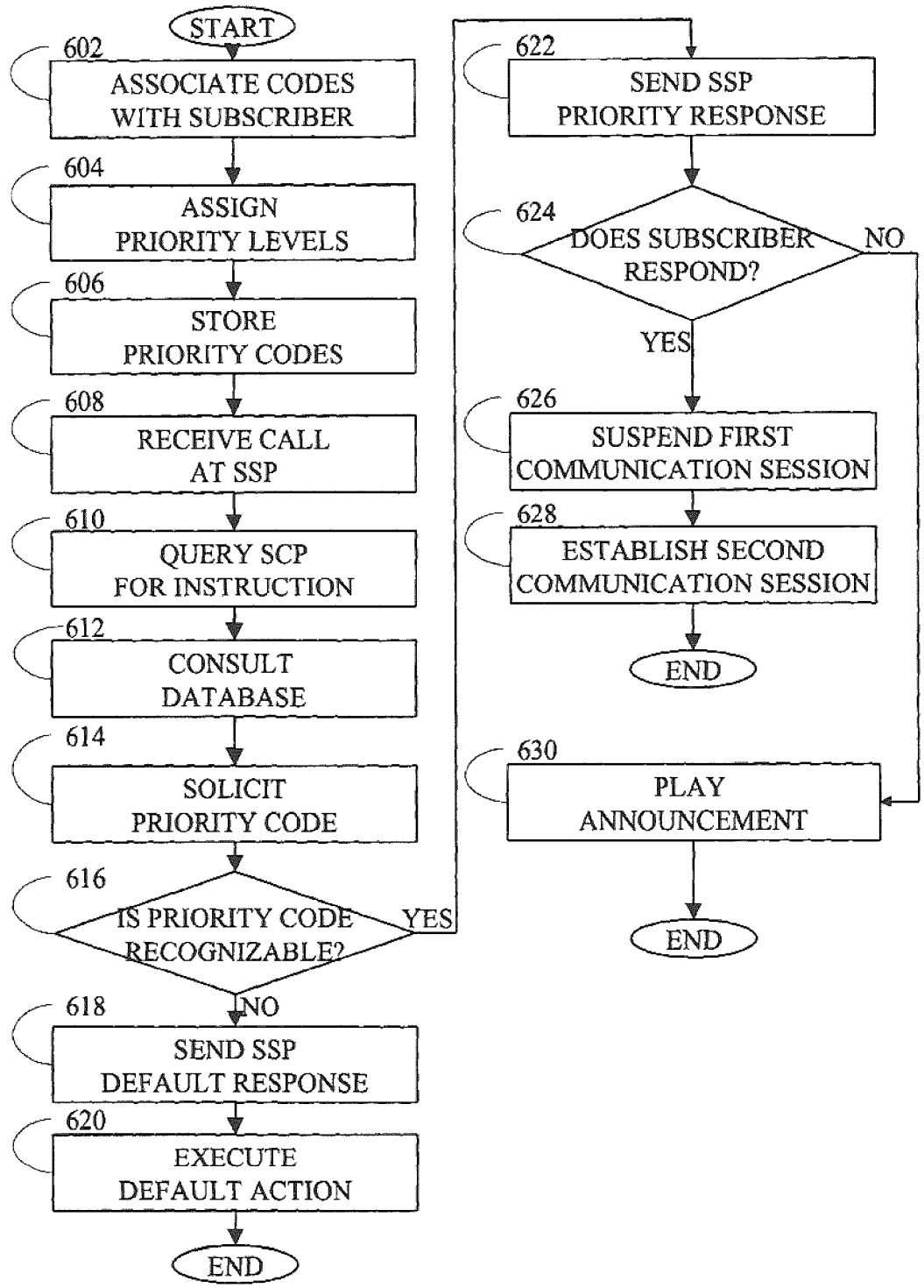
FIG. 6 is a flowchart illustrating the steps involved in using the second preferred embodiment of the present invention.

FIG. 6 is an exemplary flowchart illustrating steps that may be executed to implement the second preferred embodiment of the present invention. In step 602, a plurality of priority codes are associated with the subscriber number. In step 604, the priority codes are assigned priority levels and priority alert signals, as shown in Table 2 below.

TABLE 2

Call Waiting Alert Levels for Subscriber Number 123-456-7890

| Recognizable Priority Codes | Priority Level | Priority Alert Signal |
|---|---|---|
| 1111 | Low | A |
| 2222 | Medium | B |
| 3333 | High | C |

As shown in Table 2, subscriber 310 can provide potential calling parties with one or more of the three priority codes. In one instance, subscriber 310 can provide first calling party 330 with only the first priority code "1111," second calling party 530 with only the second priority code "2222," and all other priority calling parties with only the third priority code "3333." In this manner, as each of the three priority codes is associated with a priority alert signal, subscriber 110 would know that first calling party 330 is trying to reach him when he hears Priority Alert Signal A. Similarly, if Priority Alert Signal B is heard, subscriber 310 knows that it is second calling party 530 who is trying to reach him. In a specific example, Priority Alert Signals A, B, and C may comprise one, two, and three beeps, respectively. It is known in the art that distinctive ringing patterns are resident in switching software, including that provided by Lucent Technologies, Nortel Networks, and other manufacturers of telecommunication equipment.

Subscriber 310 can also provide all potential calling parties with all three priority codes. In this manner, subscriber 310 can inform his or her potential calling parties to use different priority codes for different level of priority or urgency. For example, subscriber 310 can request them to use "1111" for ordinary calls, "2222" for a call with a more urgent nature, and "3333" only in exceptional circumstances.

In step 606, the priority codes and associated levels of priority alert signals can be stored in a database. For example, Table 2 can be stored in database 342.

In step 608, when trigger 318 detects an incoming call from a calling party while telephone line 314 is already engaged in a first communication session between subscriber 310 and third party 320. In step 610, SSP 316 launches a query to SCP 340. For example, the query may be a Termination Busy/No Answer query. The query may contain, among other information, the subscriber number in the Called_Party_ID field.

In step 612, SCP 340 consults database 342. Using the information in the Called_Party_ID field of the query, SCP 340 may access subscriber information for subscriber 310. For example, using "123-456-7890," SCP 340 can retrieve Table 2 shown above.

In step 614, SCP 340 instructs SSP 316 to solicit a priority code from the calling party. In step 616, if the calling party does not provide a recognizable priority code, i.e., none of the "1111," "2222," and "3333," has been provided, the process goes to step 618. In step 618, SCP 340 sends a default response to SSP 316. The default response may be to play an announcement for the calling party in step 620. Alternatively, the default response may be to provide subscriber 310 with a regular call waiting tone in step 620.

However, if in step 616 a recognizable priority code was provided by the calling party, SCP 340 sends SSP 316 a priority response in step 622. The priority response may comprise, for example, an appropriate priority alert signal that is associated with the priority code supplied by the calling party. For example, if the calling party had supplied "1111" as the priority code, then Priority Alert Signal A would be indicated in the response. The priority alert signal may be indicated, for example, in a ControllingLegTreatment field of the priority response.

In step 624, SSP 316 plays for subscriber 310 an appropriate priority alert signal in accordance with the indicator appearing in the ControllingLegTreatment field of the response from SCP 340. Subscriber 310 can decide, based on the type of priority alert signal played whether to answer the call. If subscriber 310 decides to answer the call by pressing an appropriate key, e.g., the "flash" key, the process goes to step 626. Otherwise, the process goes to step 630, in which an announcement may be played by SSP 316 to the calling party that subscriber 310 is unavailable or other default handling is provided. Alternatively, the call may be directed, for example, to an alternate destination such as the subscriber's voicemail.

In step 626, SSP 316 suspends the first communication session between subscriber 310 and third party 320. SSP 316 then establishes a second communication session between subscriber 310 and the calling party in step 628.

The present invention has numerous embodiments and applications. Each of the embodiments comprises one or more of the steps described above, and other steps known to one of ordinary skill in the art. The steps may be implemented in any logical order, i.e., the order is not limited to the order in which the steps are described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A non-transitory computer readable medium containing instructions that, when executed by a computing device, cause the computing device to perform acts for providing priority call waiting services for a subscriber of a telephone line, the acts comprising:

associating a telephone number of the telephone line with a plurality of priority codes, wherein each of the plurality of priority codes associated with the telephone number represents a different priority level that is representative of a degree of urgency of a call;

assigning a priority alert signal to each of the plurality of priority codes associated with the telephone number such that the priority alert signal of each of the plurality of priority codes identifies the degree of urgency for the subscriber;

providing multiple priority codes to each one of a plurality of calling parties prior to a call being placed by the plurality of calling parties to enable the plurality of calling parities to choose a level of urgency for a call to the subscriber, wherein the priority codes provided to a first calling party of the plurality of calling parties are unique to the first calling party.

2. The computer readable medium of claim 1, the acts further comprising:

receiving the call from one of the plurality of calling parties dialing the telephone number while the telephone line is engaged in a first communication session between the subscriber and a third party;

receiving one of the priority codes from the calling party during the call to the subscriber to allow the calling party to identify the level of urgency of the call; and determining whether the priority code provided by the calling party matches any of the party of priority codes associated with the telephone number.

3. The computer readable medium of claim 1, the acts further comprising:

sending to the same telephone number dialed by the calling part a priority alert signal assigned to the priority code provided by the calling party that is indicative of the level of urgency of the call to alert the subscriber to the level of urgency of the call from the calling parity if the priority code provided by the calling party matches one of the plurality of priority codes associated with the telephone number.

4. The computer readable medium of claim 1, wherein a second communication session is established between the calling party and the subscriber if the subscriber chooses to suspend the first communication session.

5. The computer readable medium of claim 1, wherein each priority alert signal assigned to each of the priority of priority codes is unique to the calling party.

6. The computer readable medium of claim 1, wherein a second calling party is provided by the subscriber with more priority codes associated with the telephone number than is provided to the first calling party.

7. A non-transitory computer readable medium containing instructions that, when executed by a computing device, cause the computing device to perform acts for providing a call waiting service to a subscriber of a telephone line, the acts comprising:

associating two or more priority codes with a telephone number of the telephone line in an accessible database, wherein each of the two or more priority codes is associated with a priority level of a plurality of priority levels that represent a degree of urgency, and each of the plurality of priority levels is associated with a priority alert signal that identifies the degree of urgency for the subscriber;

providing multiple priority codes to each one of a plurality of calling parties prior to a call being placed by the plurality of calling parties to enable the plurality of calling parties to choose a level of urgency for a call to the subscriber, wherein the priority codes provided to the first calling party of the plurality of calling parties are unique to the first calling party.

8. The computer readable medium of claim 7, the acts further comprising:

receiving the call from one of the plurality of calling parties while the telephone line is engaged in a first communication session between the subscriber and a third party;

receiving one of the priority codes from the calling party during the call to the subscriber to allow the calling party to identify the level of urgency for the call; and determining whether the priority code from the calling party matches a priority code accessible in the database.

9. The computer readable medium of claim 7, the acts further comprising:

when the priority code matches, determining the priority alert signal for the priority code.

10. The computer readable medium of claim 9, the acts further comprising sending an instruction to send the priority alert signal to the same telephone number dilated by the calling party.

11. The computer readable medium of claim 10, wherein a control field of the instruction specifies the priority alert signal to play.

12. The computer readable medium of claim 11, the acts further comprise:

playing the priority alert signal specified by the control field for the same telephone number dialed by the calling party to interfere with the first communication session between the subscriber and the third party to alert the subscriber of the level of urgency of the call.

13. The computer readable medium of claim 7, wherein a second commutation session is established between the calling party and the subscriber if the subscriber chooses to suspend the first communication session.

14. The computer readable medium of claim 7, wherein the priority code provided by the calling party is unique to the calling party.

15. The computer readable medium of claim 7, the acts further comprising:

determining whether the priority code provided by the calling party matches any of the two or more priority codes associated with the telephone number.

16. A non-transitory computer readable medium containing instructions that, when executed by a computing device, cause the computing device to perform acts for providing a call waiting service to a subscriber of a telephone line, the acts comprising:

associating a telephone number of the telephone line with a plurality of priority codes, wherein each of the plurality of priority codes is further associated with a priority level of a plurality of priority levels that represent a degree of urgency;

assigning a priority alert signal to each of the plurality of priority codes to thereby identify the degree of urgency for the subscriber by the priority alert signal; and providing multiple priority codes to each one of a plurality of calling parties prior to a call from the plurality of calling parties to the subscriber to enable the plurality of calling parties to choose a level of urgency for a communication to the subscriber, wherein the priority codes provided to a first calling party of the plurality of calling parties are unique to the first calling party.

17. The computer readable medium of claim 16, the acts further comprising:

receiving a second communication from one of the plurality of calling parties while the telephone line is engaged in a first communication session between the subscriber and a third party; and receiving one of the priority codes from the calling party during the call to the subscriber to allow the second party to identify the level of urgency of the call.

18. The computer readable medium of claim 16, the acts further comprising:

sending to the telephone number a priority alert signal assigned to the priority code provided by the calling party and indicative of the level of urgency of the call to alert the subscriber to the level of urgency of the call.

19. The computer readable medium of claim 16, wherein an additional calling party is provided by the subscriber with more priority codes associated with the telephone number than is provided to the second party.

20. The computer readable medium of claim 16, wherein a second communication session is established between the party and the subscriber if the subscriber chooses to suspend the first communication session.

* * * * *